(12) United States Patent
Winner et al.

(10) Patent No.: US 7,831,820 B2
(45) Date of Patent: *Nov. 9, 2010

(54) SYSTEM AND METHOD FOR CONVERTING A TARGET COMPUTING DEVICE TO A VIRTUAL MACHINE IN RESPONSE TO A DETECTED EVENT

(75) Inventors: Eric Joseph Winner, Woodinville, WA (US); Marios Zikos, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1282 days.

This patent is subject to a terminal disclaimer.

(21) Appl. No.: 11/165,755

(22) Filed: Jun. 23, 2005

(65) Prior Publication Data
US 2006/0294516 A1 Dec. 28, 2006

(51) Int. Cl.
G06F 15/177 (2006.01)
G06F 15/173 (2006.01)
G06F 9/00 (2006.01)

(52) U.S. Cl. .......................... 713/1; 709/220; 709/221; 709/222; 709/223; 718/1

(58) Field of Classification Search .................... 713/1; 718/1; 709/220–223
See application file for complete search history.

(56) References Cited

U.S. PATENT DOCUMENTS

| | | | | |
|---|---|---|---|---|
| 5,504,922 A * | 4/1996 | Seki et al. | | 703/25 |
| 6,799,269 B2 * | 9/2004 | Dowling | | 712/244 |
| 6,839,061 B1 * | 1/2005 | Kamakura et al. | | 345/520 |
| 7,010,717 B2 | 3/2006 | Whitlow | | |
| 7,356,679 B1 | 4/2008 | Le et al. | | |
| 7,577,722 B1 * | 8/2009 | Khandekar et al. | | 709/220 |
| 2005/0216920 A1 | 9/2005 | Tewari et al. | | |
| 2007/0006225 A1 * | 1/2007 | McAlister et al. | | 718/1 |

OTHER PUBLICATIONS

Cadman Chui, Enhancing Virtual Machine Infrastructure through Automation published on Jul. 26, 2004.*
U.S. Appl. No. 11/165,753: Non Final Office Action, Nov. 9, 2009, 14 pages.
U.S. Appl. No. 11/165,753: Final Office Action, Apr. 27, 2010, 16 pages.

* cited by examiner

Primary Examiner—Abdelmoniem Elamin
(74) Attorney, Agent, or Firm—Woodcock Washburn LLP

(57) ABSTRACT

A system and method for converting a target computing device to a virtual machine are provided. A conversion event is detected to initiate a conversion of a target computing device to a virtual machine. An assessment of the physical and software assets of a target computing device are obtained. A data image of the target computing device is deployed on an instance of a virtual machine. The virtual machine adjusted to correspond to the physical and software assets of the target computing device.

20 Claims, 7 Drawing Sheets

SYSTEM AND METHOD FOR CONVERTING A TARGET COMPUTING DEVICE TO A VIRTUAL MACHINE IN RESPONSE TO A DETECTED EVENT

FIELD OF THE INVENTION

In general, the present invention relates to computer software and communication networks, and, in particular, to a system and method for converting a target computing device to a virtual machine based on a detected event.

BACKGROUND OF THE INVENTION

Generally described, virtual machines correspond to software applications on a computing device that emulate the performance of one or more hardware devices. In one embodiment, virtual machines may be utilized to mimic the characteristics of a specific piece of hardware. For example, a virtual machine may be used on a computing device having a processor from a first manufacturer to mimic the characteristics of a processor from a second manufacturer. In a more complex embodiment, a virtual machine can be configured to emulate an entire computing device by emulating specific hardware characteristics and being configured with specific software applications. For example, a host computing device may host multiple virtual machines that are configured to emulate the same hardware components but utilize different operating systems (e.g., version or manufacturer). In another example, a host computing device, such as a Web server, may host multiple virtual machines in which each virtual machine acts as an "independent" Web server with specific hardware and software configurations.

In one application, virtual machines may be utilized to emulate another computing device, such as a physical computing device or other virtual machine. For example, a user or system administrator may wish to "convert" a physical machine to a virtual machine that emulates a similar hardware configuration to the physical machine. Current approaches to convert target computing devices (e.g., a physical machine) to virtual machines corresponds to a multi-step approach that requires manual intervention from a knowledgeable user. Thus, the conversion process can be cumbersome and inefficient. Further, the conversion process can not be readily applied to various scenarios for implementing a virtual machine conversion.

Thus, there is a need for a system and method for converting target computing devices to virtual machines in a more efficient manner.

SUMMARY OF THE INVENTION

A system and method for converting a target computing device to a virtual machine are provided. A conversion event is detected to initiate a conversion of a target computing device to a virtual machine. An assessment of the physical and software assets of a target computing device are obtained. A data image of the target computing device is deployed on an instance of a virtual machine. The virtual machine adjusted to correspond to the physical and software assets of the target computing device.

In accordance with an aspect of the present invention, a method for configuring a virtual machine to correspond to a target computing device is provided. In accordance with the method, a conversion event of a target computing device is detected. Upon detection, an assessment of physical and software assets of the target computing device is obtained. A data image of the target computing device is captured. Additionally, a configuration a configuration of the virtual machine is automatically adjusted based upon the assessment of the physical and software assets of the target computing device.

In accordance with another aspect of the present invention, a method for converting a target computing device to a virtual machine is provided. In accordance with the method, a conversion event is detected. Upon detection of the event, an assessment of physical and software assets of the target computing device is obtained. An image of the target computing device is ported to the virtual machine. A configuration of the virtual machine is automatically adjusted based upon the assessment of the physical and software assets of the target computing device. The target computing device is shut down and the virtual machine is brought on line.

In accordance with a further aspect of the present invention, a computer-readable medium having computer-executable components for configuring a virtual machine to correspond to a target computing device is provided. The computer-executable components include a target computing device assessment component for generating an assessment of target computing device hardware and software assets. The computer-executable components also include a virtual machine creation component for initializing an instance of a virtual machine and for deploying a data image of the target computing device on the virtual machine. The computer-executable components further include a virtual machine configuration component for configuring one or more aspects of the virtual machine according to the target computing device hardware and software assets.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to a system and method for converting a target computing device to a virtual machine in response to a detected conversion event. More specifically, the present invention corresponds to a system and method for detecting one or more events to initiate a conversion, assessing target computing device assets, porting them to a virtual machine and updating the virtual machine configuration. Although the present invention will be described with regard to a system of target computing devices, configuration servers, hosting servers and their respective functionality, the disclosed embodiments are illustrative in nature and should not be construed as limiting.

Figure 1:
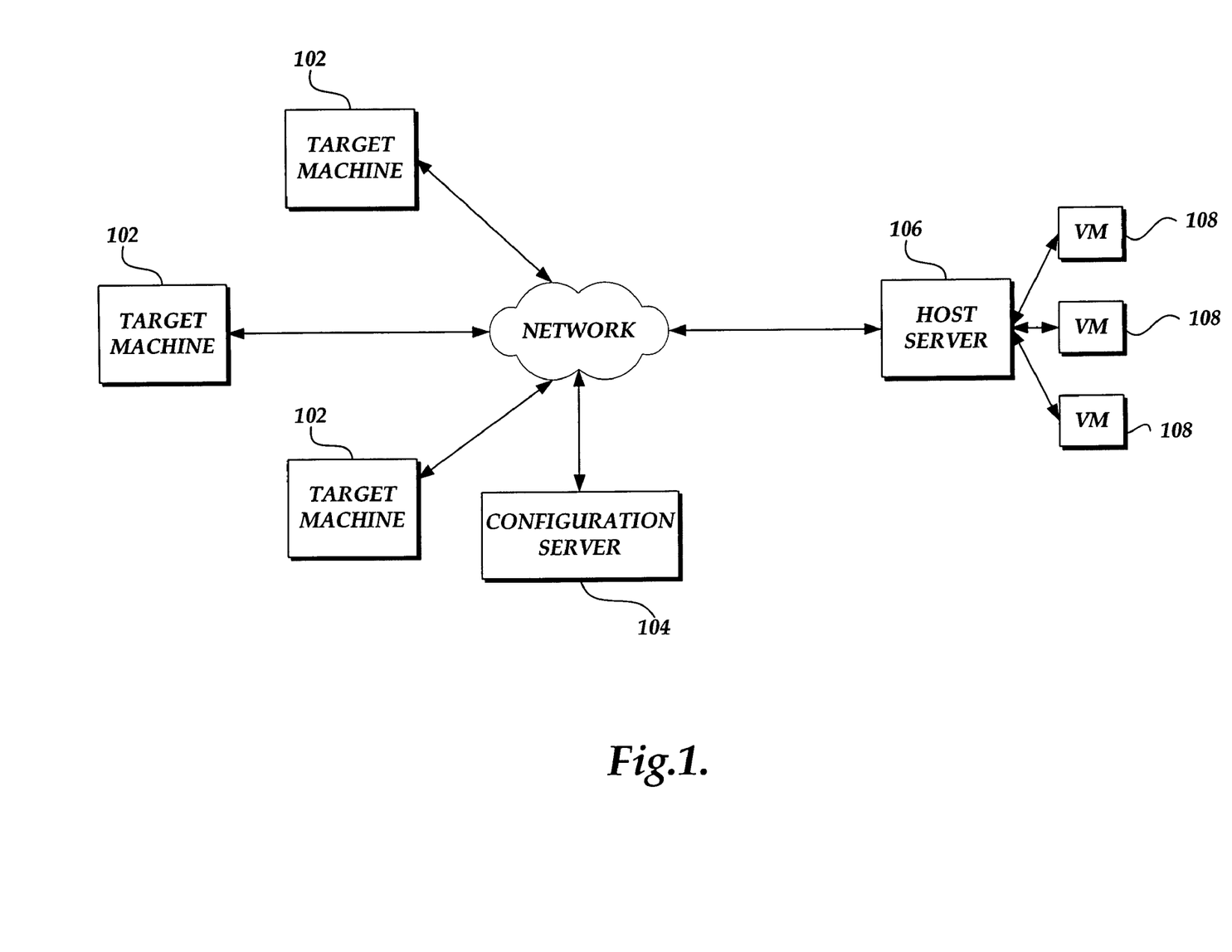
FIG. 1 is a block diagram illustrative of a system for converting target computing devices to virtual machines including one or more target computing devices, a configuration server and a host server hosting one or more virtual machines in accordance with the present invention.

FIG. 1 is a block diagram illustrative of a system 100 for converting target computing devices to virtual machines. The system 100 includes one or more target computing devices 102 in communication with a communication network, such as a local area network or a wide area network. In an illustrative embodiment of the present invention, the target computing devices 102 can correspond to physical computing devices, such as server computing devices, personal computing devices, mobile computing devices, mobile telephones, and/or any device having computing device functionality. Additionally, one or more target computing devices 102 can correspond to previously configured virtual machines hosted by a computing device. As will be described in greater detail below, each of the target computing devices 102 include various physical and software assets.

The system 100 includes a configuration server 104 in communication with the communication network. The configuration server 104 includes one or more software components for obtaining an assessment of the physical and software assets for target computing devices 102 and for initializing the creation of a virtual machine to emulate the target computing device. Additionally, the configuration server 104 includes one or more software components for capturing a data image of the target computing devices 102 and deploying the image on the virtual machines. The system 100 further includes one or more host server 106 that include one or more virtual machines 108. In an illustrative embodiment of the present invention, each virtual machine can be configured with hardware and software assets to emulate a target computing device 102. Additionally, the host server 106 can include software components for updating the configuration of the virtual machine based upon the assessment of a target computing device 102 and the particular limitations/implementation of the virtual machine 108, as will be described in greater detail below.

Figure 2A:
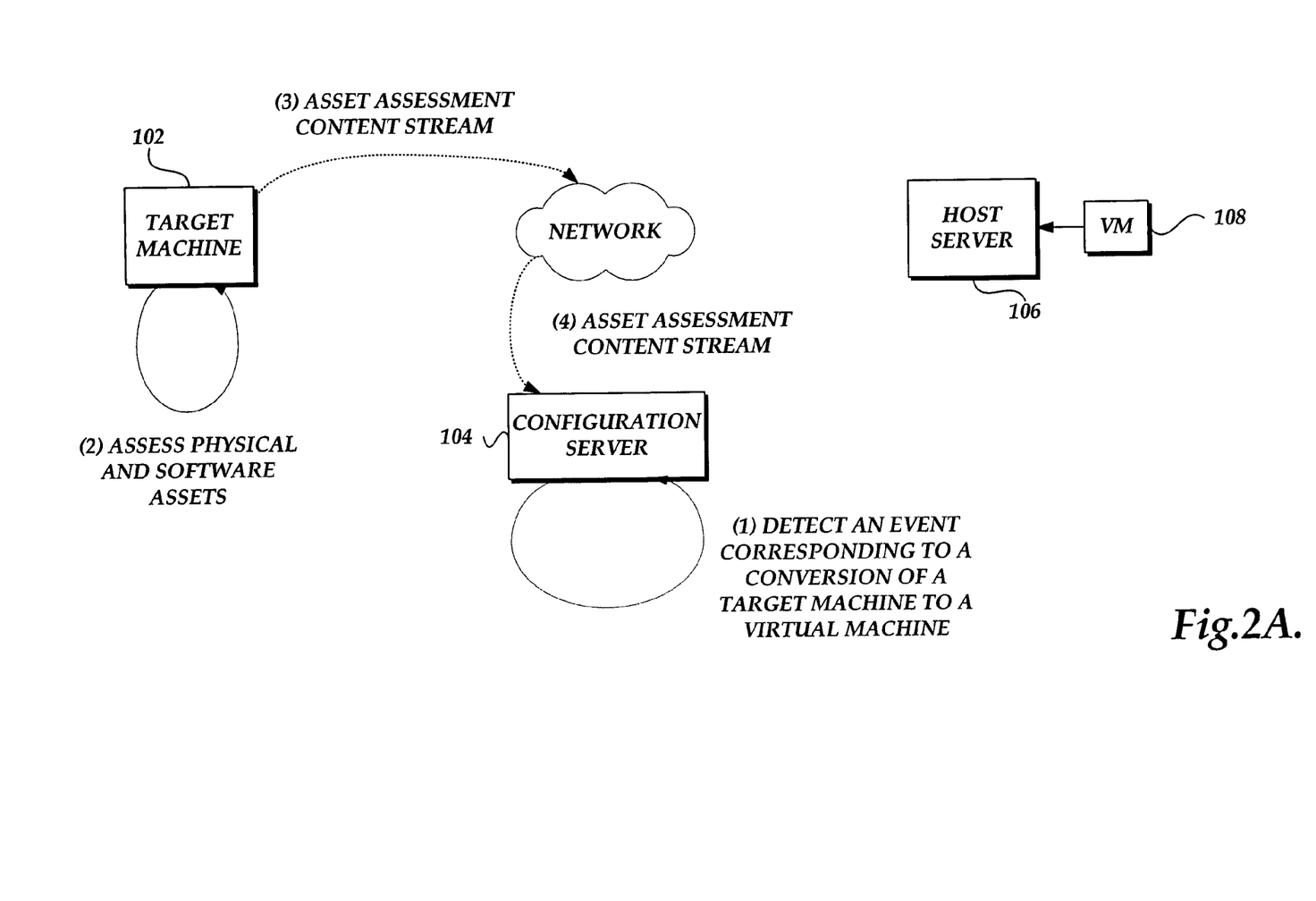
FIGS. 2A and 2B are block diagrams of the system of FIG. 1 illustrating the detection of a conversion event, an assessment of a target computing device and the configuration of a virtual machine to correspond to the target computing device in accordance with an aspect of the present invention.
Figure 2B:
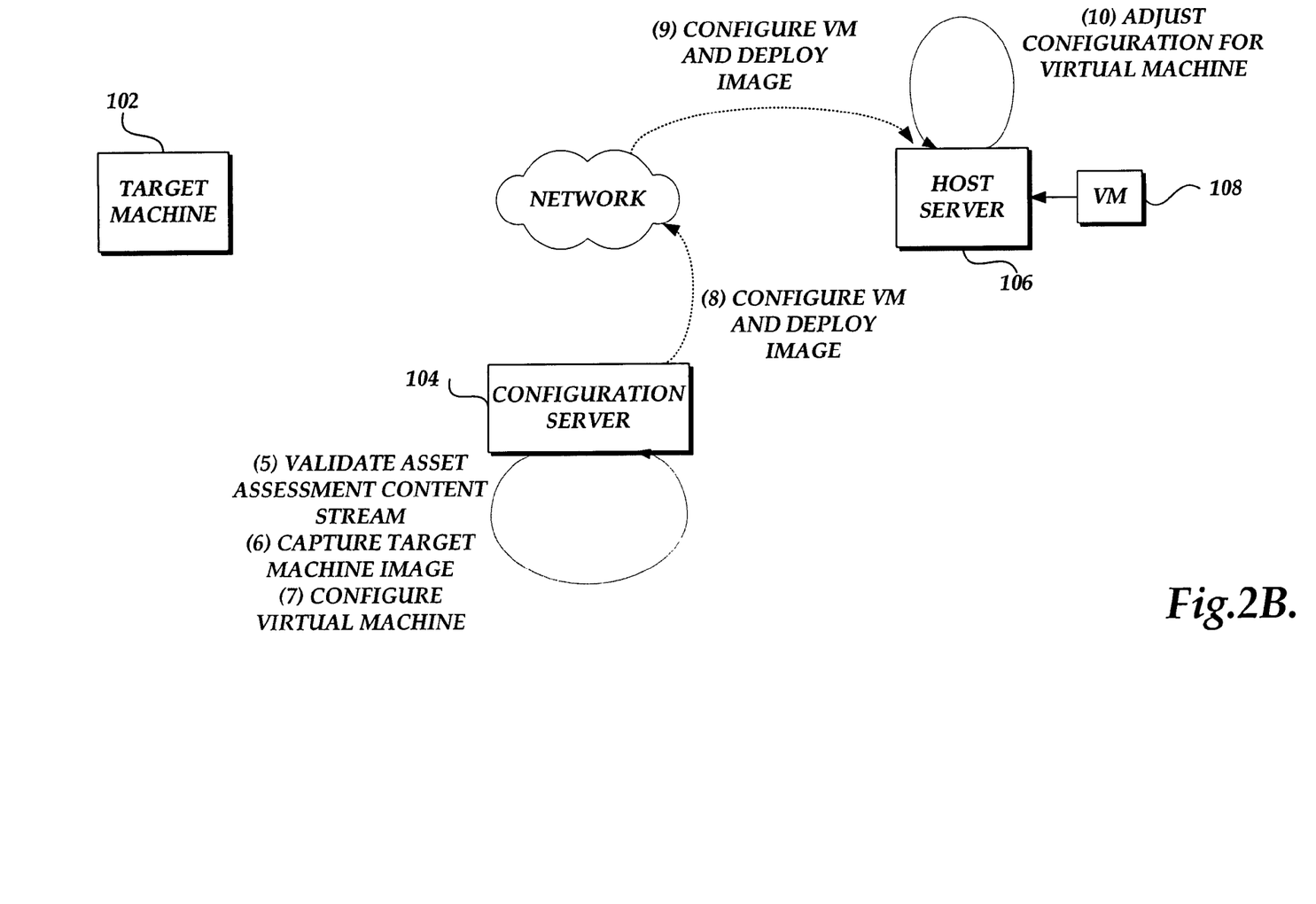

With reference now to FIGS. 2A and 2B, an illustrative process for converting a target computing device 102 to a virtual machine 108 will be described. Referring to FIG. 2A, the process begins with the detection of a conversion event by the configuration server 104. In an illustrative embodiment of the present invention, the detection of a conversion event may correspond to an action by a user or network administrator. Alternatively, the detection of a conversion event may correspond to a monitoring of one or more criteria and automatically determining a conversion event. Detection of conversion events will be described in greater detail below. Upon detection of a conversion event, the target computing device 102 begins an assessment of various physical and software assets of the target computing device 102. In an illustrative embodiment of the present invention, the configuration server 104 transmits a software module and/or instructions to the target computing device to collect a set of physical and software assets. The software module/instructions may utilize one or more utilities provided by the operating system to collect the asset information. Alternatively, the target computing device 102 may also utilize additional third party software components. Once the physical and software assets are collected, they are transmitted over the communication network to the configuration server 104.

Referring to FIG. 2B, the configuration server 104 obtains the hardware and software asset from the target computing device 102 and validates the assessment. The validation can correspond to verification that the assessment data is proper and/or whether the target computing device 102 can be emulated by a virtual machine 108. The configuration server 104 then identifies a target virtual machine 108 by instantiating the creation of the virtual machine on a host server 106 or identifying an existing virtual machine on a host server. The configuration server 104 then captures a data image of the data stored on the target computing device 102. In an illustrative embodiment of the present invention, the configuration server 104 may copy the data image to a data store associated with configuration server 104. Alternatively, the configuration server 104 may utilize one or more services for creating a virtual volume for temporarily storing the data image. The configuration server 104 than transmits a virtual machine configuration and data image deployment to the host server 106.

Upon receipt of the virtual machine configuration and data image deployment, the host server updates the configuration of the virtual machine to correspond to the target computing device hardware and software assessment and the limitations of the virtual machine. As will be explained in greater detail, the host server 106 can adjust the configuration of the virtual machine to correspond to operating environment differences, driver incompatibilities and/or service incompatibilities. Once the virtual machine configuration has been updated, the data image is ported to the virtual machine. The target computing device 102 can be shut down and the virtual machine brought on line.

Figure 3A:
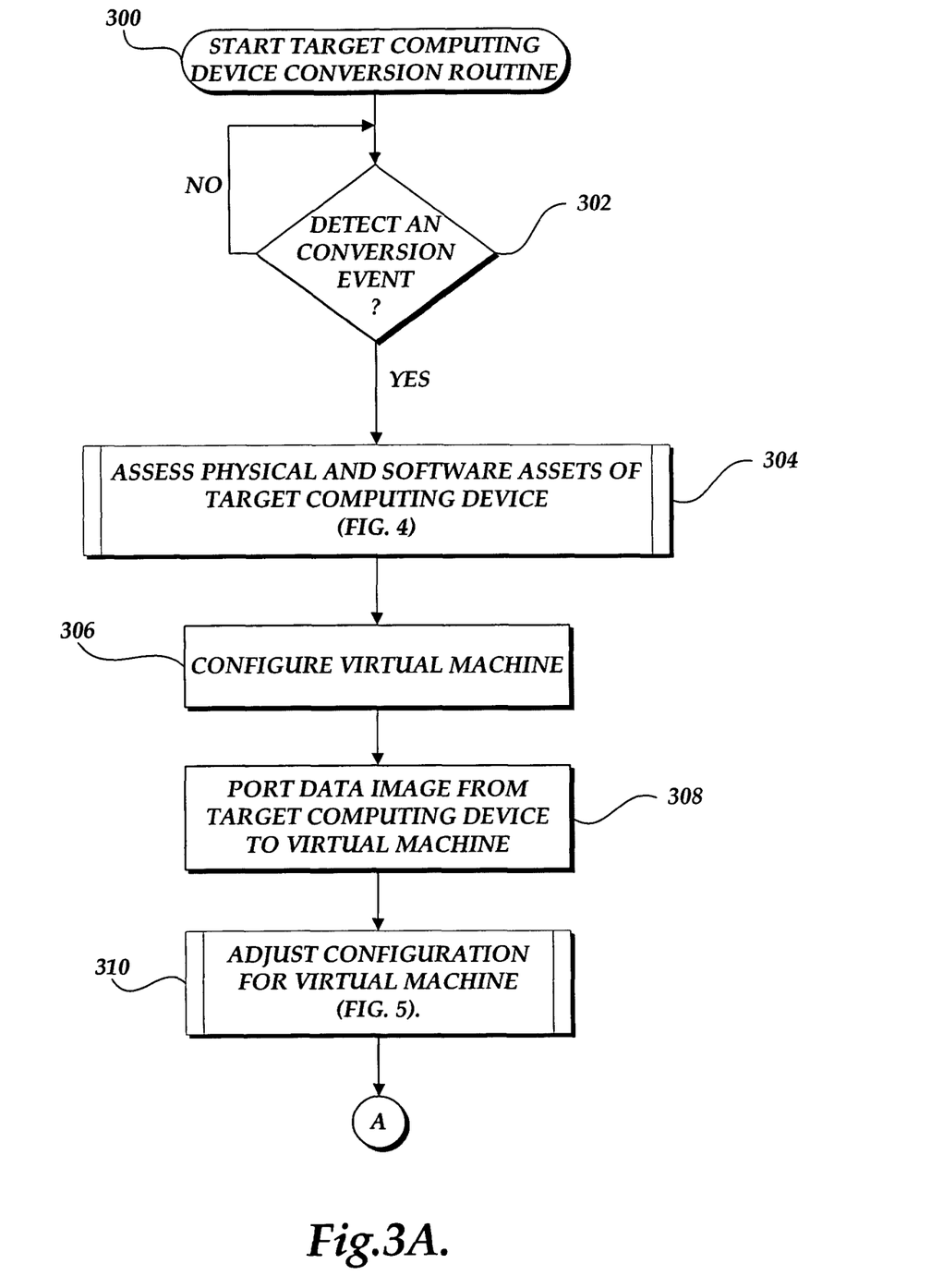
FIGS. 3A and 3B are a flow diagram illustrative of a target computing device conversion routine in accordance with the present invention.
Figure 3B:
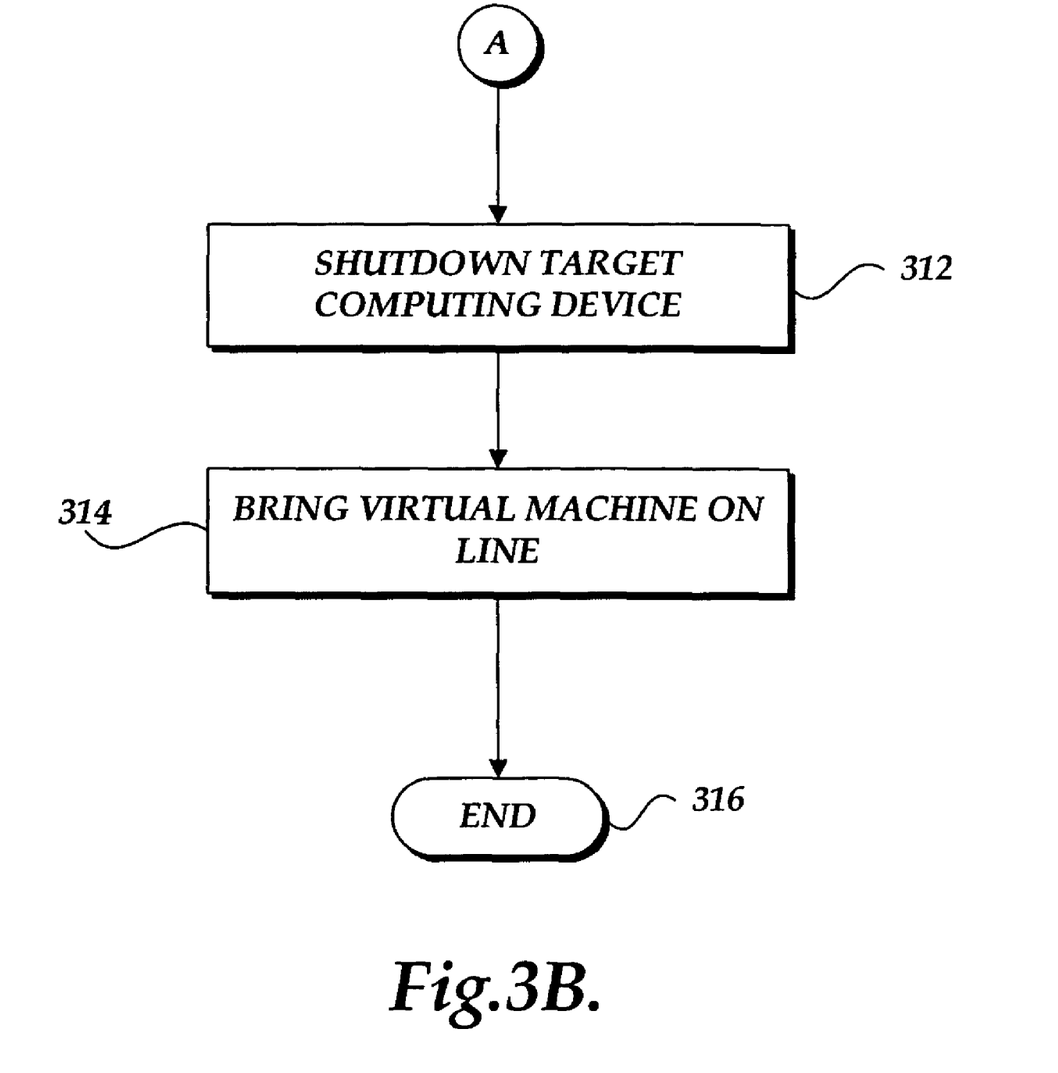
Figure 4:
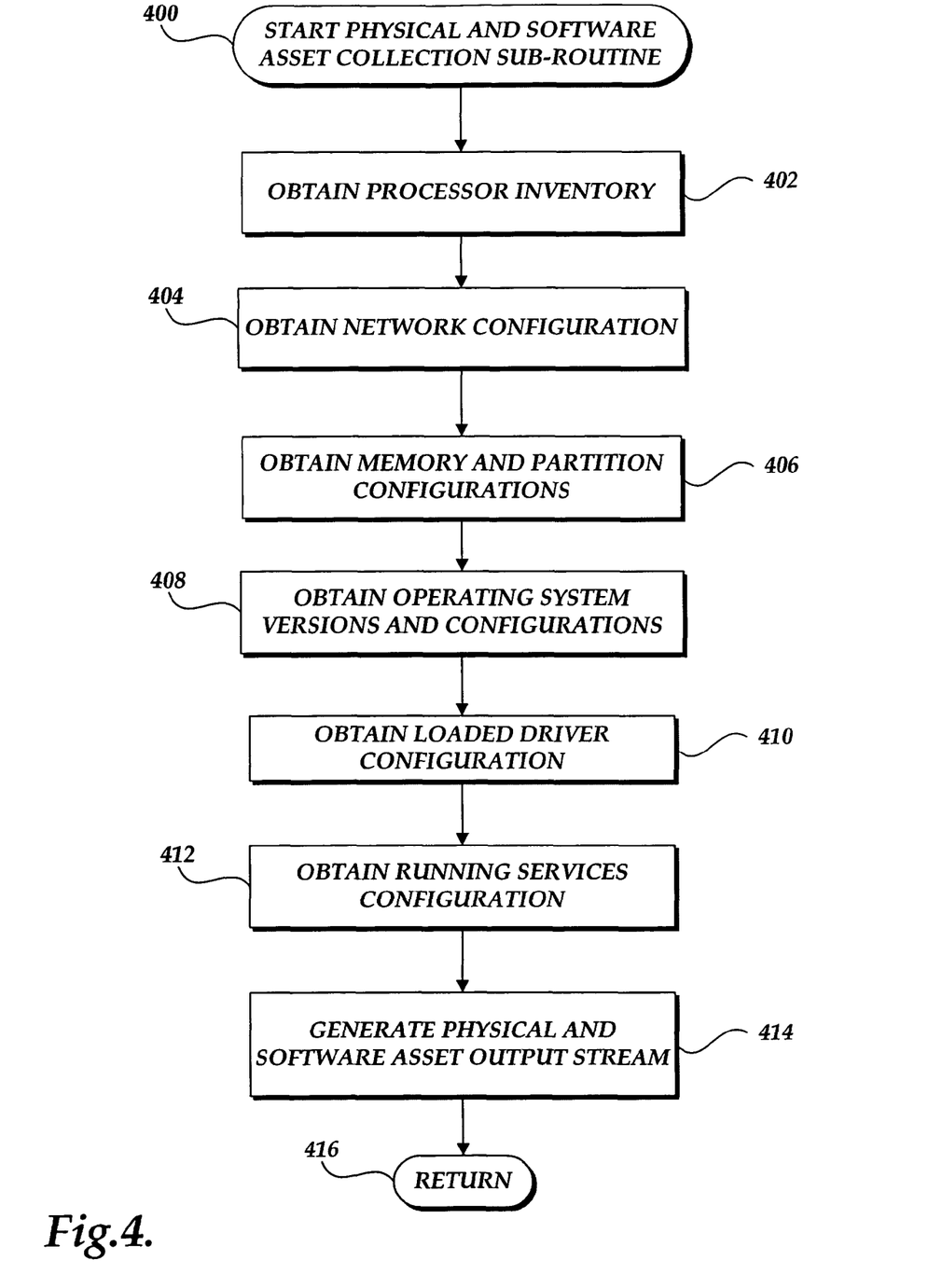
FIG. 4 is a flow diagram illustrative of a target computing device physical and software asset assessment sub-routine in accordance with the present invention.
Figure 5:
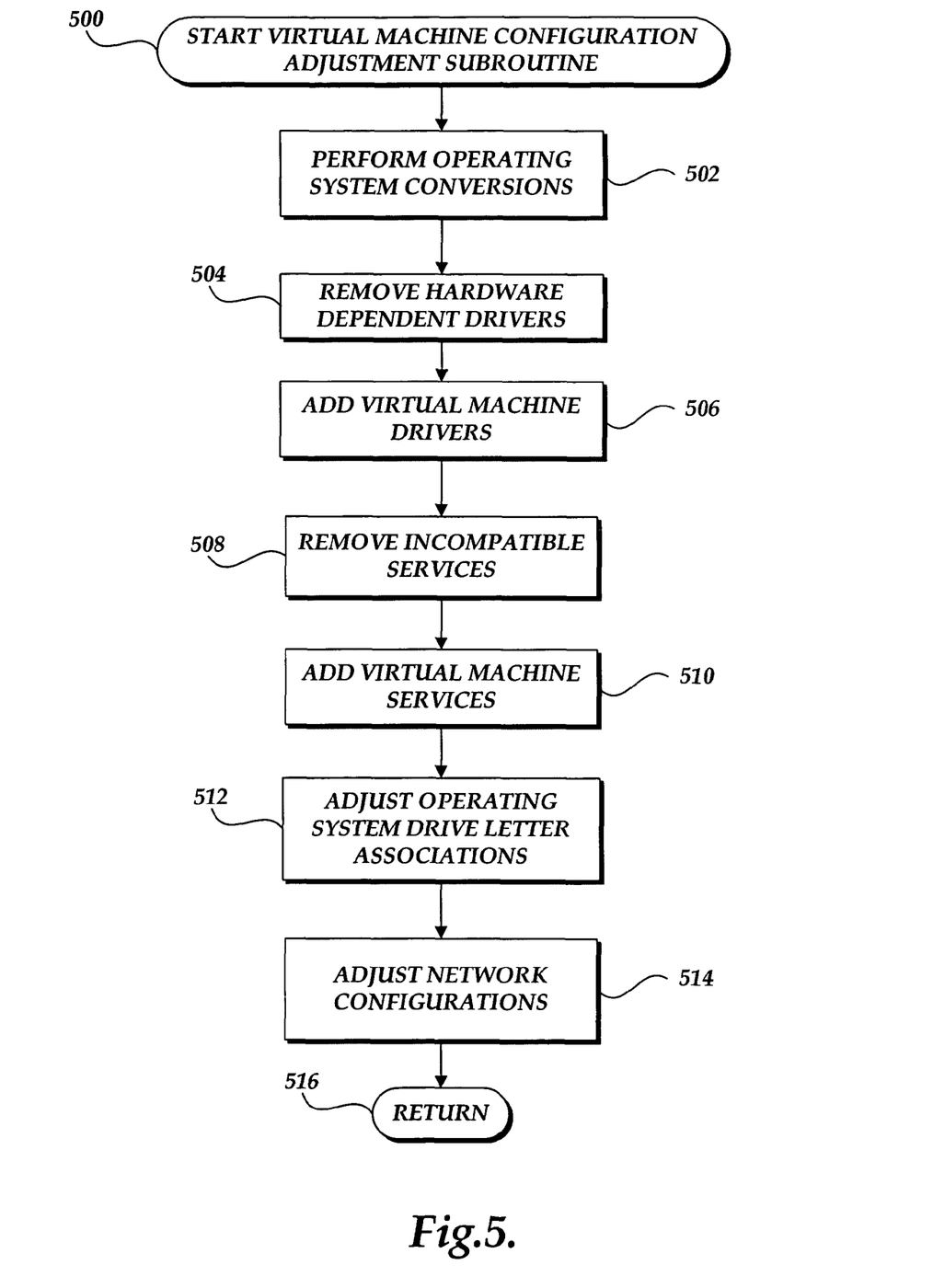
FIG. 5 is a flow diagram illustrative of a virtual machine configuration update sub-routine in accordance with the present invention.

With reference now to FIGS. 3-5 illustrative routines for converting a target computing device 102 to a virtual machine 108 will be described. With reference to FIGS. 3A and 3B, a routine 300 for converting a target computing device 102 to a virtual machine 108 will be described. Referring to FIG. 3A, at decision block 302, a test is conducted to determine whether a conversion event has occurred. In an illustrative embodiment of the present invention, the configuration server 104 can monitor a variety of criteria that could correspond to a detection event. In one aspect, the detection event can correspond to an action initiated by a user, such as a system administrator. In one example, a user may be presented with a screen interface in which one or more target computing devices 102 are represented as icons. A conversion event may correspond to a drag and drop operation on the screen display that directs the configuration server 104 to initiate a conversion of the target computing device 102 represented by the icon. Additionally, the drag and drop operation may indicate which host computing device 106 should be hosting the virtual machine 108. Alternatively, the conversion event may correspond to a manipulation of one or more menus and/or command prompts when an icon corresponding to a target computing device 102 is selected.

In another aspect of the present invention, a conversion event may correspond to monitoring of one or more criteria by the configuration server 104 and/or the target computing device 102. In one example, one or more operating parameters of the target computing devices 102 may be monitored. If a failure of one or more components is detected and/or a failure for one or more components is predicted a conversion event may be initiated. In a further aspect of the present invention, a conversion event may correspond to performance optimization criteria of the target computing devices 102. In one example, target computing device 102 resources may be monitored. If the target computing device's resources are overused or beyond a threshold, the target computing device 102 may be converted to a virtual machine 108 that has more adequate resources. In a similar manner, if the target computing device's resources are being underutilized, the target computing device 102 may be converted to a virtual machine 108 to free up the target computing device resources for other purposes.

In still a further aspect of the present invention, the conversion event may correspond to system administrative functions. In one example, a conversion event may be detected prior to the installing an update to software components of a current version of a target computing device 102. In the event of a failure during the installation or incompatibility of the update, the target computing device 102 can be "restored" by reference to the virtual machine 108. Similarly, the conversion event may be detected prior to testing a recently installed piece of software. In another example, a conversion event may be detected as part of a customer support of a target computing device 102. In this example, the target computing device 102 may be converted to a virtual machine 108 that can be accessed by a remote customer support representative. One skilled in the relevant art will appreciate that additional detection event scenarios would also be considered to be within the scope of the present invention.

At block 304, the physical and software assets of the target computing device 102 are assessed. In an illustrative embodiment of the present invention, the physical and software assessment is collected at the target computing device 102 and transmitted to the configuration server 104. The collection of the physical and software assets will be described below with regard to sub-routine 400 (FIG. 4). At block 306, a virtual machine 108 is configured. In an illustrative embodiment of the present invention, the configuration server 108 identifies a host computing device 106 that can instantiate a virtual machine 108 capable of emulating the target computing device 102. The configuration server 104 can utilize various criteria, such as load balancing and/or consolidation, in selecting and instantiating a virtual machine 108 on a particular host server 106.

At block 308, the configuration server 104 ports the data image from the target computing device 102 to the virtual machine 108. In an illustrative embodiment of the present invention, the configuration server 104 can utilize one or more services for capturing the data image of the target computing device 102. For example, the configuration server 104 can utilize a network-based service to capture the data image and store the data image in a "virtual hard drive" on the network for transfer to the virtual machine. Alternatively, the configuration server 104 may capture and store the image locally. By capturing the data image from the target computing device 102, the virtual machine 108 will have the exact same software configurations as the target computing device. At block 310, the host server 106 adjusts the configuration of the virtual machine 108 based upon the hardware and software assessment and the particular limitations of the virtual machine. The adjustment of the virtual machine configuration will be described with regard to sub-routine 500 (FIG. 5).

With reference now to FIG. 3B, at block 312, the target computing device 102 is shut down or otherwise disconnected from the communication network. At block 314, the virtual machine 108 is brought on-line and connected to the communication network. At block 316, the routine 300 terminates.

With reference now to FIG. 4, a sub-routine 400 for generating an assessment of various physical and software assets of a target computing device 102 corresponding to block 304 (FIG. 3) will be described. At block 402, a processor inventory is obtained. In an illustrative embodiment of the present invention, the processor inventory corresponds to a number and type of processor inventory. At block 404, a network configuration is obtained. In an illustrative embodiment of the present invention, the network configuration can correspond to the number of network interface cards and specific configuration information for each identified card. At block 406, memory and partition configuration information is obtained. In an illustrative embodiment of the present invention, the memory and partition configuration can include an identification of the memory components of the target computing device including RAM and hard drives. Additionally, the configuration information can include how memory, such as the hard drives, is partitioned.

At block 408, operating system version and configuration information is obtained. In an illustrative embodiment of the present invention, the operating system configuration information can include an identification of particular operating system version. Additionally, the operating system configuration information can include an identification of particular patches, updates and/or additional modifications to the identified version of the operating system. At block 410, an identification of loaded drivers is obtained. In an illustrative embodiment of the present invention, the identification of loaded drivers can include an identification of hardware-specific drivers. At block 412, an identification of running services is collected. At block 414, an output stream of the hardware and software assessment is generated for transmission to the configuration server. In an illustrative embodiment of the present invention, the output stream can correspond to an XML document. At block 416, the sub-routine 400 returns.

With reference now to FIG. 5, a sub-routine 500 for adjusting the configuration of a virtual machine 108 corresponding to block 310 (FIG. 3) will be described. At block 502, the host computing device 106 performs any operating system and hardware conversions. In an illustrative embodiment of the present invention, the virtual machine 108 may have limitations as to the minimum and/or maximum of processors that it can support. Accordingly, if the target computing device 102 hardware assessment indicates a number of processors that are above/below the limitations of the virtual machine 108, the host server 106 may convert the assessment to be compatible with the virtual machine. Additionally, the host server 106 may also make additional operating system conversions to support the hardware limitations of the virtual machine 108.

At block 504, the host server 106 removes any hardware dependent drivers and adds any virtual machine drivers at block 506. In an illustrative embodiment of the present invention, hardware dependent drivers on the target computing device 102 may not work properly on the virtual machine and can be replaced by virtual machine drivers. Additionally, the host server 106 may add additional drivers to correspond any hardware conversions corresponding to block 502. Further, the host server 106 may add drivers required for operation of the virtual machine 108. In a similar fashion, at block 508, the host server 106 removes any incompatible services and adds any virtual machine services at block 510.

At block 512, the host server 106 may adjust operating system drive letter associations. In an illustrative embodiment of the present invention, the target computing device 102 may have specific driver letter associations. However, the virtual machine 108 may utilize a different order in assigning driver letters during the initial boot of the operating system on the virtual machine. Accordingly, the host server 106 may maintain the target computing device's previous drive letter associations. At block 514, the host server 106 adjusts the network configuration for the virtual machine 108. In an illustrative embodiment of the present invention, the host server 106 can configure the virtual machines network interface cards to match the target computing device's configuration and/or make any adjustments. In an illustrative embodiment of the present invention, blocks 512 and 514 may occur during the initial boot of the operating system on the virtual machine 108. At block 516, the sub-routine 500 returns.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer implemented method for configuring a virtual machine to correspond to a target computing device, the computer comprising at least one processor and at least one memory communicatively coupled to said processor, the method comprising:
   receiving by said computer an indication of a conversion event of a target computing device;
   receiving by said computer an assessment of physical and software assets of the target computing device;
   receiving by said computer a data image of the target computing device; and
   automatically adjusting a configuration of the virtual machine based upon the assessment of the physical and software assets of the target computing device.

2. The method as recited in claim 1, wherein the conversion event corresponds to at least one of a user-instantiated event, a monitored event, a network administrative event, or a performance optimization event.

3. The method as recited in claim 2, wherein the user-instantiated conversion event comprises a drag and drop of a representation of a target computing device on a screen display.

4. The method as recited in claim 2, wherein the monitored event comprises a detection of hardware failure on the target computing device or a predicted hardware failure on the target computing device.

5. The method as recited in claim 2, wherein network administrative event comprises the installation of a software update on the target computing device.

6. The method as recited in claim 2, wherein the network administrative event comprises a remote customer support interaction.

7. The method as recited in claim 2, wherein the performance optimization event comprises a measure of an underutilization of target computing device resources.

8. The method as recited in claim 1, wherein said assessment of physical and software assets of the target computing device includes information comprising at least one of: a target computing device processor inventory, a target computing device network configuration, a target computing device memory and partition configuration, a target computing device driver configuration and a target computing device service configuration.

9. The method as recited in claim 1, wherein said automatically adjusting a configuration of the virtual machine based upon the assessment of the physical and software assets of the target computing device includes:
   comparing an operating system configuration of the target computing device and an operating system configuration of the virtual machine;
   performing loaded driver conversions; and
   performing running services conversions.

10. The method as recited in claim 9 wherein said performing loaded driver conversions includes:
    removing at least one hardware-specific driver; and
    adding at least one driver associated with the virtual machine.

11. A computer implemented method for converting a target computing device to a virtual machine, the computer comprising at least one processor and at least one memory communicatively coupled to said processor, the method comprising:
    receiving by said computer an indication that a conversion event has occurred;
    in response to said conversion event, transmitting to said target computing device an instruction to collect information and generate an assessment regarding physical and software assets of the target computing device;
    receiving by said computer the assessment of the physical and software assets of the target computing device;
    validating the assessment and determining that the target computing device can be emulated;
    creating or identifying a virtual machine on a host server;
    porting an image of the target computing device to the virtual machine; and
    automatically adjusting a configuration of the virtual machine to correspond to the target computing device based upon the assessment of the physical and software assets of the target computing device.

12. The method as recited in claim 11, wherein the conversion event corresponds to at least one of a user-instantiated event, a monitored event, a network administrative event, or a performance optimization event.

13. The method as recited in claim 11, wherein said assessment of physical and software assets of the target computing device includes information comprising at least one of: a target computing device processor inventory, a target computing device network configuration, a target computing device memory and partition configuration, a target computing device driver configuration and a target computing service configuration.

14. The method as recited in claim 11, wherein said automatically adjusting a configuration of the virtual machine based upon the assessment of the physical and software assets of the target computing device includes:
    comparing an operating system configuration of the target computing device and an operating system configuration virtual of the virtual machine;
    performing loaded driver conversions; and
    performing running services conversions.

15. A computer-readable storage medium having computer-executable components for configuring a virtual machine to correspond to a target computing device, the components comprising:
    a conversion event detection component for detecting a conversion event and initiating an assessment of hardware and software assets associated with the target computing device;
    a target computing device assessment component for obtaining an assessment of target computing device hardware and software assets;
    a virtual machine creation component for initializing an instance of a virtual machine and for deploying a data image of the target computing device on the virtual machine; and
    a virtual machine configuration component for configuring one or more aspects of the virtual machine according to the target computing device hardware and software assets.

16. The computer-readable storage medium as recited in claim 15, wherein the target computing device assessment component obtains information comprising at least one of: a target computing device processor inventory, a target computing device network configuration, a target computing device memory and partition configuration, a target computing device driver configuration and a target computing device service configuration.

17. The computer-readable storage medium as recited in claim 15, wherein the conversion event detection component detects at least one of a user-instantiated event, a monitored event, a network administrative event, or a performance optimization event.

18. The computer-readable storage medium as recited in claim 17, wherein the conversion event detection component detects a user manipulation of a menu as the user-instantiated event.

19. The computer-readable storage medium as recited in claim 17, wherein the conversion event detection component detects an underutilization of target computing device resources as the performance optimization event.

20. The computer-readable storage medium as recited in claim 17, wherein the conversion event detection component detects a proposed testing of an installed software application as the network administrative event.

\* \* \* \* \*